United States Patent
Wells et al.

(10) Patent No.: US 6,861,167 B2
(45) Date of Patent: Mar. 1, 2005

(54) FUEL CELL RESUSCITATION METHOD AND APPARATUS

(75) Inventors: Brian Wells, Vancouver (CA); Tan Duc Uong, Coquitlam (CA); Charles Joseph Schembri, Langley (CA); Gregory A. James, Coquitlam (CA); George Alexander Skinner, Burnaby (CA); Benno Giesecke, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 193 days.

(21) Appl. No.: 09/916,213

(22) Filed: Jul. 25, 2001

(65) Prior Publication Data

US 2003/0022042 A1 Jan. 30, 2003

(51) Int. Cl.⁷ ............................................. H01M 8/00
(52) U.S. Cl. ............................ 429/13; 429/17; 429/21; 429/22; 429/23; 429/34; 429/39
(58) Field of Search .............................. 429/13, 17, 22, 429/23, 21, 34, 39

(56) References Cited

U.S. PATENT DOCUMENTS

| | | | |
|---|---|---|---|
| 3,553,026 A | 1/1971 | Winsel | 136/86 |
| 3,615,842 A | 10/1971 | Craft et al. | 136/86 |
| 3,697,325 A | 10/1972 | Baude | 136/86 B |
| 3,775,282 A | 11/1973 | Craft et al. | 204/266 |
| 3,850,696 A | 11/1974 | Summers et al. | 136/86 B |
| 4,243,731 A | 1/1981 | Cherón | 429/13 |
| 5,397,655 A | 3/1995 | Bette et al. | 429/13 |
| 5,478,662 A | 12/1995 | Strasser | 429/13 |
| 5,939,218 A | 8/1999 | Mizuno | 429/23 |
| 6,093,500 A | 7/2000 | Margiott et al. | 429/13 |
| 6,093,502 A | 7/2000 | Carlstrom, Jr. et al. | 429/25 |
| 6,140,820 A | 10/2000 | James | 324/434 |
| 6,242,120 B1 | 6/2001 | Herron | 429/22 |
| 6,497,971 B1 * | 12/2002 | Reiser | 429/13 |

FOREIGN PATENT DOCUMENTS

| | | |
|---|---|---|
| EP | 982 788 A2 | 3/2000 |
| EP | 1 018 774 A1 | 7/2000 |
| GB | 1 223 941 | 3/1971 |
| WO | WO 91/19328 | 12/1991 |
| WO | WO 99/28985 | 6/1999 |
| WO | WO 00/74162 A1 | 12/2000 |
| WO | WO 01/26173 A1 | 4/2001 |
| WO | WO 01/26174 A1 | 4/2001 |

OTHER PUBLICATIONS

Abstract of EP 1 018 774 A1 esp@cenet.com database, Jul. 12, 2000.

Jake de Vaal and Harvindra Deo, "Fuel Cell Ambient Environment Monitoring and Control Apparatus and Method," U.S. application No. 09/916,241, Jul. 25, 2001.

(List continued on next page.)

*Primary Examiner*—Bruce F. Bell
(74) *Attorney, Agent, or Firm*—Seed IP Law Group PLLC

(57) ABSTRACT

A fuel cell system includes fuel cells forming a fuel cell stack, having a fuel passage and an oxidant passage. A purge valve is coupled to the fuel passage to exhaust contaminants, and a controller is coupled to temporarily increase the oxidant stream flow rate through the oxidant passage, and to temporarily open the fuel purge valve, if a voltage across a pair of fuel cells is less than a defined threshold voltage. In this resuscitation step, the oxidant flow rate can be temporarily increased by increasing a duty cycle of an air compressor by approximately 50% for a duration of between approximately 5 to 10 seconds. The controller can further shut down fuel cell operation if a voltage across a pair of fuel cells is less than a defined threshold voltage in an inter-resuscitation period immediately following the resuscitation step.

41 Claims, 9 Drawing Sheets

OTHER PUBLICATIONS

Robert Kenneth Parr, "Fuel Cell Controller Self Inspection," U.S. application No. 09/916,117, Jul. 25, 2001.

Brian Wells, "Fuel Cells Anomaly Detection Method and Apparatus," U.S. application No. 09/916,115, Jul. 25, 2001.

Russell Howard Barton et al., "Fuel Cell Purging Method and Apparatus," U.S. application No. 09/916,211, Jul. 25, 2001.

Robert Kenneth Parr and Brian Wells, "Fuel Cell System Method, Apparatus and Scheduling," U.S. application No. 09/916,240, Jul. 25, 2001.

David S. Manery, "Fuel Cell System Automatic Power Switching Method and Apparatus," U.S. application No. 09/916,239, Jul. 25, 2001.

Russell Howard Barton and Tan Duc Uong, "Product Water Pump for Fuel Cell System," U.S. application No. 09/916,118, Jul. 25, 2001.

Brian Wells and Kenneth W. Strang, "Fuel Cell System Having a Hydrogen Sensor," U.S. application No. 09/916,212, Jul. 25, 2001.

* cited by examiner

FUEL CELL RESUSCITATION METHOD AND APPARATUS

BACKGROUND OF THE INVENTION

1. Technical Field

The present invention relates to fuel cells, and particularly to control systems for fuel cells.

2. Description of the Related Art

Electrochemical fuel cells convert fuel and oxidant to electricity. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell.

Due to their zero- or low-emission nature, and ability to operate using renewable fuels, the use of fuel cells as primary and/or backup power supplies is likely to become increasingly prevalent. For example, a fuel cell stack can serve as an uninterruptible power supply for computer, medical, or refrigeration equipment in a home, office, or commercial environment. Other uses are of course possible.

SUMMARY OF THE INVENTION

There is a need for improved control and operating systems for fuel cell systems, and for methods of controlling and operating such fuel cell systems, particularly where there is a decrease in performance. Such systems and methods can, for example, detect lower fuel cell stack performance and respond by temporarily adjusting the reactant flow to the fuel cell stack in an attempt to improve performance, and/or shutting down fuel cell stack operation when such an attempt fails.

In one aspect, a fuel cell system includes fuel cells forming a fuel cell stack having a fuel passage and an oxidant passage, and a controller coupled to temporarily increase the oxidant stream flow rate through the oxidant passage of the fuel cell stack in response to a parameter indicative of a drop in performance of the fuel cell stack and/or at fixed time intervals during operation of the stack. The temporary increase in oxidant stream flow rate preferably results in a temporary increase in oxidant stoichiometry. The parameter indicative of the performance of the fuel cell stack may be the voltage across one or more of the fuel cells in the stack. For example, in a fuel cell system having an air compressor for delivery of oxidant air to the stack, airflow can be increased by increasing a duty cycle of an air compressor by approximately 50% for a resuscitation duration of approximately 5 to 10 seconds, if a voltage across any pair of fuel cells is less than a defined threshold voltage. If the parameter indicative of performance indicates insufficient performance recovery once the oxidant stream flow rate is reduced following the temporary increase, the controller can be coupled to shut down fuel cell operation. For example, if a voltage across a pair of fuel cells is less than a threshold voltage during a defined inter-resuscitation period following the temporary increase in oxidant stream flow rate, the controller can be coupled to shut down fuel cell operation. With respect to temporarily increasing the oxidant stream flow rate at fixed time intervals during operation of the stack, this can be done independently of any parameter indicative of fuel cell performance, but is particularly effective for improving performance during periods of operation at low power, for example when the power output of the stack or the electrical load on the stack falls below a threshold value.

In embodiments where the fuel cell is configured to operate on a substantially pure fuel stream with the fuel passage dead-ended but coupled to a purge valve for periodic exhausting of contaminants from the fuel passage, the controller can be coupled to the purge valve and configured to open the purge valve for a purge duration at the same time as the controller increases an oxidant stream flow rate through the oxidant passage of the fuel cell stack as described above. The controller can open the purge valve under other conditions as well, without simultaneously increasing the oxidant stream flow rate. In a specific embodiment, a resuscitation system for use with a fuel cell assembly includes a purge valve couplable to exhaust contaminants from a fuel passage of a fuel cell stack, an airflow source couplable to provide an airflow through the fuel cell stack, and a controller coupled to the purge valve and configured to open the purge valve for a purge duration and to increase the airflow from the airflow source, if a voltage across a pair of adjacent fuel cells is less than a defined threshold voltage.

In a further aspect, a method of operating a fuel cell system includes temporarily increasing the oxidant stream flow rate through the oxidant passage of the fuel cell stack for a resuscitation duration, in response to a parameter indicative of a drop in performance of the fuel cell stack. The method comprises monitoring a parameter indicative of fuel cell performance and comparing it to a threshold value. For example, the method can involve monitoring the voltage across a pair of fuel cells, and determining if it is less than a defined threshold voltage. The threshold could be a defined absolute value or a variable reference value, for example related to the actual momentary average stack voltage. The method can further comprise shutting down fuel cell operation if the parameter indicative of performance indicates insufficient performance recovery during a defined inter-resuscitation period once the oxidant stream flow rate is reduced, following the temporary increase.

In a further aspect, a method of operating a fuel cell system includes temporarily increasing the oxidant stream flow rate through the oxidant passage of the fuel cell stack, at defined time intervals during operation of the stack. This aspect of the method is particularly effective for improving performance during periods of operation at low power. For example, the method can include monitoring the power output of the stack or the electrical load on the stack and temporarily increasing the oxidant stream flow rate at fixed time intervals when the power output or electrical load falls below a threshold value.

The foregoing methods of operating a fuel cell system, which can be performed in combination, can further comprise opening a purge valve coupled to a fuel passage of the fuel cell stack for a purge duration simultaneously with increasing the oxidant stream flow rate as described.

In yet a further aspect, a computer readable media contains instructions to cause a processor to control operation of a fuel cell system, by determining if a parameter indicative of fuel cell performance is less than a defined threshold value, and temporarily increasing an oxidant stream flow rate through an oxidant passage of the fuel cell stack, and in some aspects simultaneously opening a fuel purge valve of a fuel cell stack for a purge duration, if the parameter is less than a defined threshold value.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, have been selected solely for ease of recognition in the drawings.

DETAILED DESCRIPTION OF PREFERRED EMBODIMENTS

In the following description, certain specific details are set forth in order to provide a thorough understanding of various embodiments of the invention. However, one skilled in the art will understand that the invention may be practiced without these details. In other instances, well known structures associated with fuel cells, microcontrollers, sensors, and actuators have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Fuel Cell System Overview

Figure 1:
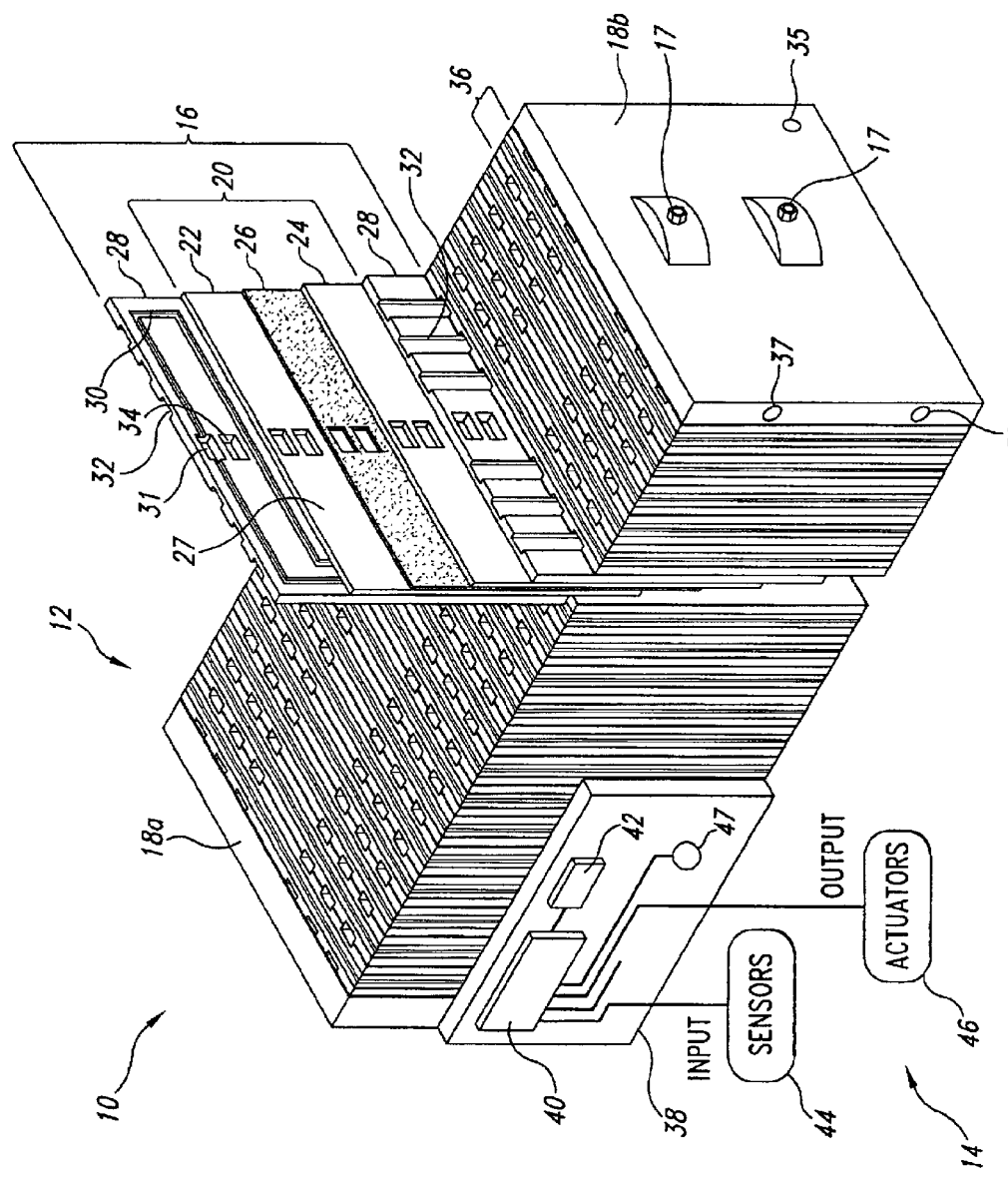
FIG. 1 is an isometric, partially exploded, view of a fuel cell system including a fuel cell stack and controlling electronics including a fuel cell monitoring and control system.

FIG. 1 shows a portion of a fuel cell system 10, namely, a fuel cell stack 12 and an electronic fuel cell monitoring and control system 14. Fuel cell stack 12 includes a number of fuel cell assemblies 16 arranged between a pair of end plates 18a, 18b, one of the fuel cell assemblies 16 being partially removed from fuel cell stack 12 to better illustrate the structure of fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 includes a membrane electrode assembly 20 including two electrodes, the anode 22 and the cathode 24, separated by an ion exchange membrane 26. Electrodes 22, 24 can be formed from a porous, electrically conductive sheet material, such as carbon fiber paper or cloth, that is permeable to the reactants. Each of electrodes 22, 24 is coated on a surface adjacent ion exchange membrane 26 with a catalyst 27, such as a thin layer of platinum, to render each electrode electrochemically active.

The fuel cell assembly 16 also includes a pair of separators or flow field plates 28 sandwiching membrane electrode assembly 20. In the illustrated embodiment, each of flow field plates 28 includes one or more reactant channels 30 formed on a planar surface of flow field plate 28 adjacent an associated one of the electrodes 22, 24 for carrying fuel to anode 22 and oxidant to cathode 24, respectively. (Reactant channel 30 on only one of flow field plates 28 is visible in FIG. 1.) Reactant channels 30 that carry the oxidant also carry exhaust air and product water away from cathode 24. As will be described in more detail below, fuel stack 12 is designed to operate in a dead-ended fuel mode, thus substantially all of the hydrogen fuel supplied to it during operation is consumed, and little if any hydrogen is carried away from stack 12 in normal operation of system 10. However, embodiments of the present invention can also be applicable to fuel cell systems operating on dilute fuels which are not dead-ended.

In the illustrated embodiment, each flow field plate 28 preferably includes a plurality of cooling channels 32 formed on the planar surface of the flow field plate 28 opposite the planar surface having reactant channel 30. When the stack is assembled, the cooling channels 32 of each adjacent fuel cell assembly 16 cooperate so that closed cooling channels 32 are formed between each membrane electrode assembly 20. Cooling channels 32 transmit cooling air through the fuel stack 12. Cooling channels 32 are preferably straight and parallel to each other, and traverse each plate 28 so that cooling channel inlets and outlets are located at respective edges of plate 28.

While the illustrated embodiment includes two flow field plates 28 in each fuel cell assembly 16, other embodiments can include a single bipolar flow field plate (not shown) between adjacent membrane electrode assemblies 20. In such embodiments, a channel on one side of the bipolar plate carries fuel to the anode of one adjacent membrane electrode assembly 20, while a channel on the other side of the plate carries oxidant to the cathode of another adjacent membrane electrode assembly 20. In such embodiments, additional flow field plates 28 having channels for carrying coolant (e.g., liquid or gas, such as cooling air) can be spaced throughout fuel cell stack 12, as needed to provide sufficient cooling of stack 12.

End plate 18a includes a fuel stream inlet port (not shown) for introducing a supply fuel stream into fuel cell stack 12. End plate 18b includes a fuel stream outlet port 35 for discharging an exhaust fuel stream from fuel cell stack 12 that comprises primarily water and non-reactive components and impurities, such as any introduced in the supply fuel stream or entering the fuel stream in stack 12. Fuel stream outlet port 35 is normally closed with a valve in dead-ended operation. Although fuel cell stack 12 is designed to consume substantially all of the hydrogen fuel supplied to it during operation, traces of unreacted hydrogen may also be discharged through the fuel stream outlet port 35 during a purge of fuel cell stack 12, effected by temporarily opening a valve at fuel stream outlet port 35. Each fuel cell assembly 16 has openings formed therein to cooperate with corresponding openings in adjacent assemblies 16 to form internal fuel supply and exhaust manifolds (not shown) that extend the length of stack 12. The fuel stream inlet port is fluidly connected to fluid outlet port 35 via respective reactant channels 30 that are in fluid communication with the fuel supply and exhaust manifolds, respectively.

End plate 18b includes an oxidant stream inlet port 37 for introducing supply air (oxidant stream) into fuel cell stack 12, and an oxidant stream outlet port 39 for discharging exhaust air from fuel cell stack 12. Each fuel cell assembly 16 has openings 31, 34, formed therein to cooperate with corresponding openings in adjacent fuel cell assemblies 16 to form oxidant supply and exhaust manifolds that extend the length of stack 12. Oxidant inlet port 37 is fluidly connected to the oxidant outlet port 39 via respective reactant channels 30 that are in fluid communication with oxidant supply and exhaust manifolds, respectively.

In one embodiment, fuel cell stack 12 includes forty-seven fuel cell assemblies 16. (FIGS. 1 and 2 omit a number of the fuel cell assemblies 16 to enhance drawing clarity). Fuel cell stack 12 can include a greater or lesser number of fuel cell assemblies to provide more or less power, respectively.

Figure 2:
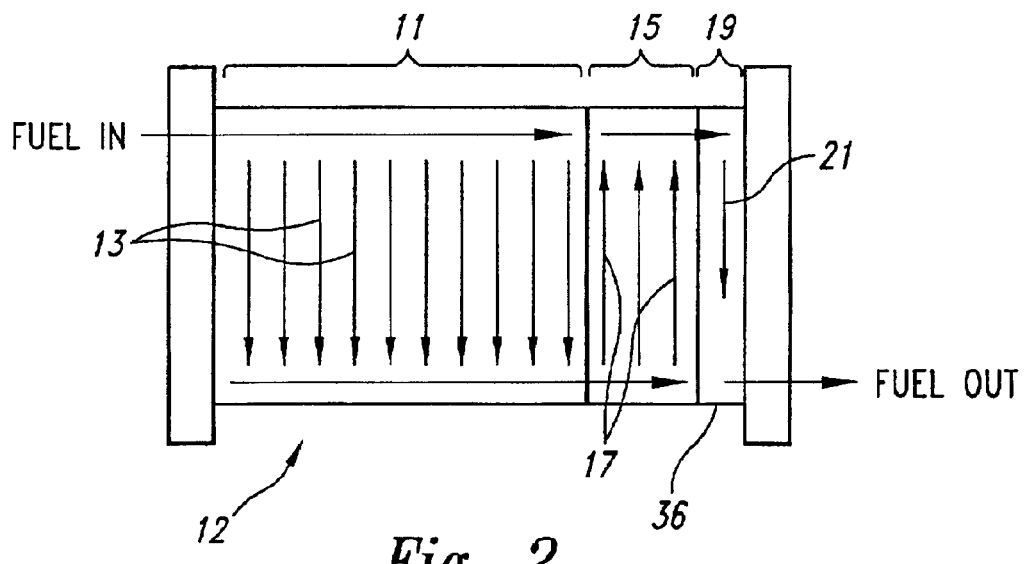
FIG. 2 is a schematic diagram representing fuel flow through a cascaded fuel cell stack of the fuel cell system of FIG. 1.

As shown in FIG. 2, fuel is directed through fuel cell stack 12 in a cascaded flow pattern. A first set 11 composed of the first forty-three fuel cell assemblies 16 are arranged so that fuel flows within the set in a concurrent parallel direction (represented by arrows 13) that is generally opposite the direction of the flow of coolant through fuel cell stack 12. Fuel flow through a next set 15 of two fuel cell assemblies 16 is in series with respect to the flow of fuel in the first set 11, and in a concurrent parallel direction within the set 15 (in a direction represented by arrows 17) that is generally concurrent with the direction of the flow of coolant through fuel cell stack 12. Fuel flow through a final set 19 of two fuel cells assemblies 16 is in series with respect to the first and second sets 11, 15, and in a concurrent parallel direction within the set 19 (in a direction represented by arrow 21) generally opposite the flow of coolant through the fuel cell stack 12. The oxidant is supplied to each of the forty-seven fuel cells in parallel, in the same general direction as the flow of coolant through the fuel cell stack 12.

The final set 19 of fuel cell assemblies 16 comprises the purge cell portion 36 of the fuel cell stack. The purge cell portion 36 accumulates non-reactive components which are periodically vented by opening a purge valve.

Each membrane electrode assembly 20 is designed to produce a nominal potential difference of about 0.6 V between anode 22 and cathode 24. Reactants (hydrogen and air) are supplied to electrodes 22, 24 on either side of ion exchange membrane 26 through reactant channels 30. Hydrogen is supplied to anode 22, where platinum catalyst 27 promotes its separation into protons and electrons, which pass as useful electricity through an external circuit (not shown). On the opposite side of membrane electrode assembly 20, air flows through reactant channels 30 to cathode 24 where oxygen in the air reacts with protons passing through the ion exchange membrane 26 to produce product water.

Fuel Cell System Sensors and Actuators

With continuing reference to FIG. 1, the electronic monitoring and control system 14 comprises various electrical and electronic components on a circuit board 38 and various sensors 44 and actuators 46 distributed throughout fuel cell system 10. The circuit board 38 carries a microprocessor or microcontroller 40 that is appropriately programmed or configured to carry out fuel cell system operation. Microcontroller 40 can take the form of an Atmel AVR RISC microcontroller available from Atmel Corporation of San Jose, Calif. The electronic monitoring and control system 14 also includes a persistent memory 42, such as an EEPROM portion of microcontroller 40 or discrete nonvolatile controller-readable media.

Microcontroller 40 is coupled to receive input from sensors 44 and to provide output to actuators 46. The input and/or output can take the form of either digital and/or analog signals. A rechargeable battery 47 powers the electronic monitoring and control system 14 until fuel cell stack 12 can provide sufficient power to electronic monitoring and control system 14. Microcontroller 40 is selectively couplable between fuel cell stack 12 and battery 47 for switching power during fuel cell system operation and/or to recharge battery 47 during fuel cell operation.

Figure 3:
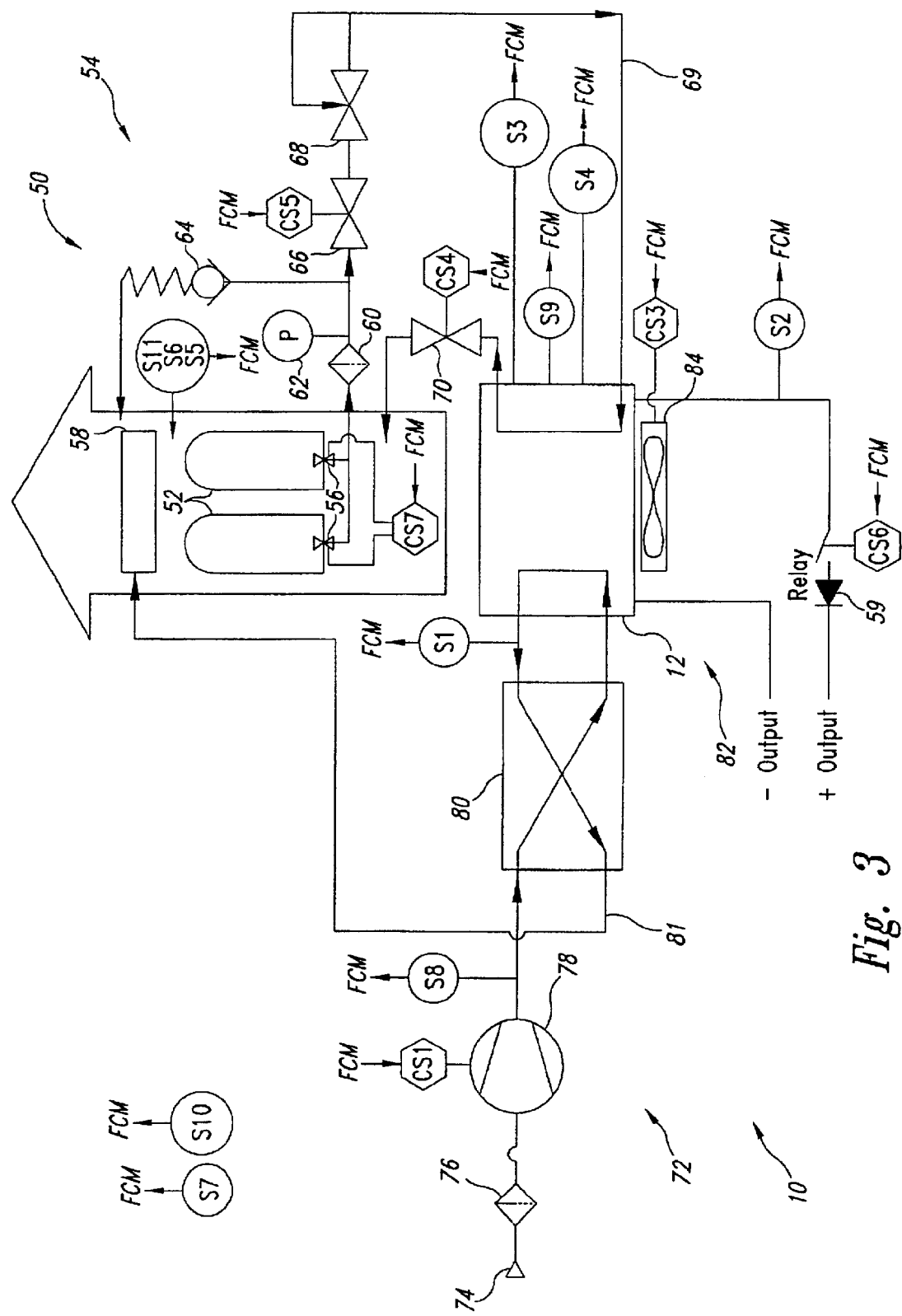
FIG. 3 is a schematic diagram of a portion of the fuel cell monitoring and control system of FIG. 1.

FIG. 3 show various elements of fuel cell system 10 in further detail, and shows various other elements that were omitted from FIG. 1 for clarity of illustration.

With particular reference to FIG. 3, fuel cell system 10 provides fuel (e.g., hydrogen) to anode 22 by way of a fuel system 50. Fuel system 50 includes a source of fuel such as one or more fuel tanks 52, and a fuel regulating system 54 for controlling delivery of the fuel. Fuel tanks 52 can contain hydrogen, or some other fuel such as methanol. Alternatively, fuel tanks 52 can represent a process stream from which hydrogen can be derived by reforming, such as methane or natural gas (in which case a reformer is provided in fuel cell system 10).

Fuel tanks 52 each include a fuel tank valve 56 for controlling the flow of fuel from respective fuel tank 52. Fuel tank valves 56 may be automatically controlled by microcontroller 40, and/or manually controlled by a human operator. Fuel tanks 52 may be refillable, or may be disposable. Fuel tanks 52 may be integral to fuel system 50 and/or fuel cell system 10, or can take the form of discrete units. In this embodiment, fuel tanks 52 are hydride storage tanks. Fuel tanks 52 are positioned within the fuel cell system 10 such that they are heatable by exhaust cooling air warmed by heat generated by fuel cell stack 12. Such heating facilitates the release of hydrogen from the hydride storage media.

Fuel cell monitoring and control system 14 includes a hydrogen concentration sensor S5, hydrogen heater current sensor S6 and a hydrogen sensor check sensor S11. Hydrogen heater current sensor S6 can take the form of a current sensor that is coupled to monitor a hydrogen heater element that is an integral component of hydrogen concentration sensor S5. Hydrogen sensor check sensor S11 monitors voltage across a positive leg of a Wheatstone bridge in a hydrogen concentration sensor S5, discussed below, to determine whether hydrogen concentration sensor S5 is functioning.

Fuel tanks 52 are coupled to the fuel regulating system 54 through a filter 60 that ensures that particulate impurities do not enter fuel regulating system 54. Fuel regulating system 54 includes a pressure sensor 62 to monitor the pressure of fuel in fuel tanks 52, which indicates how much fuel remains in fuel tanks 52. A pressure relief valve 64 automatically operates to relieve excess pressure in fuel system 50. Pressure relief valve 64 can take the form of a spring and ball relief valve. A main gas valve solenoid CS5 opens and closes a main gas valve 66 in response to signals from the microcontroller 40 to provide fluid communication between the fuel tanks 52 and fuel regulating system 54. Additional solenoids CS7 control flow through the fuel tank valves 56. A hydrogen regulator 68 regulates the flow of hydrogen from fuel tanks 52. Fuel is delivered to the anodes 22 of the fuel cell assemblies 16 through a hydrogen inlet conduit 69 that is connected to fuel stream inlet port of stack 12.

Sensors 44 of fuel regulating system 54 monitor a number of fuel cell system operating parameters to maintain fuel cell system operation within acceptable limits. For example, a stack voltage sensor S3 measures the gross voltage across fuel cell stack 12. A purge cell voltage sensor S4 monitors the voltage across purge cell portion 36 (the final set 19 of fuel cell assemblies 16 in cascaded design of FIG. 2). A cell voltage checker S9 ensures that a voltage across each of the fuel cell 20 is within an acceptable limit. Each of the sensors S3, S4, S9 provide inputs to microcontroller 40, identified in FIG. 3 by arrows pointing toward the blocks labeled "FCM" (i.e., fuel cell microcontroller 40).

A fuel purge valve 70 is provided at fuel stream outlet port 35 of fuel cell stack 12 and is typically in a closed position when stack 12 is operating. Fuel is thus supplied to fuel cell stack 12 only as needed to sustain the desired rate of electrochemical reaction. Because of the cascaded flow design, any impurities (e.g., nitrogen) in the supply fuel stream tend to accumulate in purge cell portion 36 during operation. A build-up of impurities in purge cell portion 36 tends to reduce the performance of purge cell portion 36; should the purge cell voltage sensor S4 detect a performance drop below a threshold voltage level, microcontroller 40 may send a signal to a purge valve controller CS4 such as a solenoid to open the purge valve 36 and discharge the impurities and other non-reactive components that may have accumulated in purge cell portion 36 (collectively referred to as "purge discharge"). The venting of hydrogen by the purge valve 70 during a purge is limited to prevent the monitoring and control system 14, discussed below, from triggering a failure or fault.

Fuel cell system 10 provides oxygen in an air stream to the cathode side of membrane electrode assemblies 20 by way of an oxygen delivery system 72. A source of oxygen or air 74 can take the form of an air tank or the ambient atmosphere. A filter 76 ensures that particulate impurities do not enter oxygen delivery system 72. An air compressor controller CS1 controls an air compressor 78 to provide the air to fuel cell stack 12 at a desired flow rate. A mass air flow sensor S8 measures the air flow rate into fuel cell stack 12, providing the value as an input to microcontroller 40. A humidity exchanger 80 adds water vapor to the air to keep the ion exchange membrane 26 moist. Humidity exchanger 80 also removes water vapor which is a byproduct of the electrochemical reaction. Excess liquid water is provided to an evaporator 58 via conduit 81.

Fuel cell system 10 removes excess heat from fuel cell stack 12 and uses the excess heat to warm fuel tanks 52 by way of a cooling system 82. Cooling system 82 includes a fuel cell temperature sensor S1, for example a thermister that monitors the core temperature of fuel cell stack 12. The temperature is provided as input to microcontroller 40. A stack current sensor S2, for example a Hall sensor, measures the gross current through the fuel cell stack 12, and provides the value of the current as an input to microcontroller 40. A cooling fan controller CS3 controls the operation of one or more cooling fans 84 for cooling fuel cell stack 12. After passing through fuel cell stack 12, the warmed cooling air circulates around fuel tanks 52. The warmed cooling air then passes through evaporator 58. A power relay controller CS6 such as a solenoid connects, and disconnects, fuel cell stack 12 to, and from, an external electrical circuit in response to microcontroller 40. A power diode 59 provides one-way isolation of fuel cell system 10 from the external load to provide protection to fuel cell system 10 from the external load. A battery relay controller CS8 connects, and disconnects, fuel cell monitoring and control system 14 between the fuel cell stack 12 and the battery 47.

The fuel cell monitoring and control system 14 (illustrated in FIG. 4) includes sensors for monitoring fuel cell system 10 surroundings and actuators for controlling fuel cell system 10 accordingly. For example, a hydrogen concentration sensor S5 (shown in FIG. 3) for monitoring the hydrogen concentration level in the ambient atmosphere surrounding fuel cell stack 12. The hydrogen concentration sensor S5 can take the form of a heater element with a hydrogen sensitive thermister that may be temperature compensated. An oxygen concentration sensor S7 (illustrated in FIG. 4) to monitor the oxygen concentration level in the ambient atmosphere surrounding fuel cell system 10. An ambient temperature sensor S10 (shown in FIG. 3), for example a digital sensor, to monitor the ambient air temperature surrounding fuel cell system 10.

Figure 4:
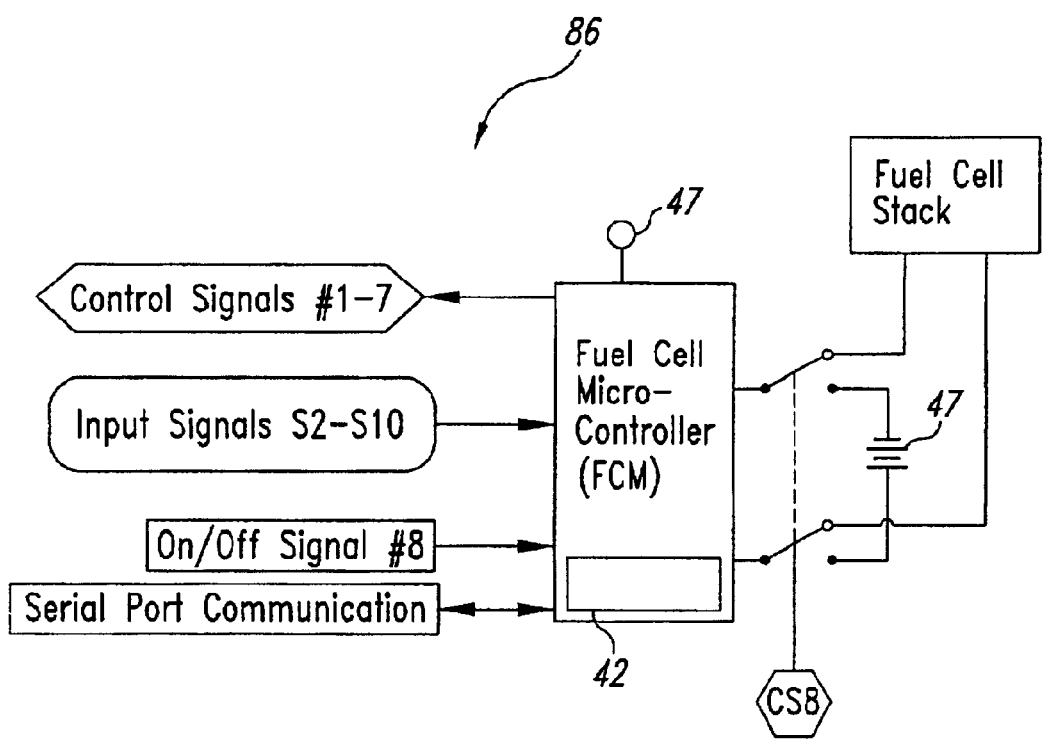
FIG. 4 is a schematic diagram of an additional portion of the fuel cell monitoring and control system of FIG. 3, including a fuel cell microcontroller selectively coupled between the fuel cell stack and a battery.

With reference to FIG. 4, microcontroller 40 receives the various sensor measurements such as ambient air temperature, fuel pressure, hydrogen concentration, oxygen concentration, fuel cell stack current, air mass flow, cell voltage check status, voltage across the fuel cell stack, and voltage across the purge cell portion of the fuel cell stack from various sensors described below. Microcontroller 40 provides the control signals to the various actuators, such as air compressor controller CS1, cooling fan controller CS3, purge valve controller CS4, main gas valve solenoid CS5, power circuit relay controller CS6, hydride tank valve solenoid CS7, and battery relay controller CS8.

Fuel Cell System Structural Arrangement

FIGS. 5–8 illustrate the structural arrangement of the components in fuel cell system 10. For convenience, "top", "bottom", "above", "below" and similar descriptors are used merely as points of reference in the description, and while corresponding to the general orientation of the illustrated fuel cell system 10 during operation, are not to be construed to limit the orientation of the fuel cell system 10 during operation or otherwise.

Figure 5:
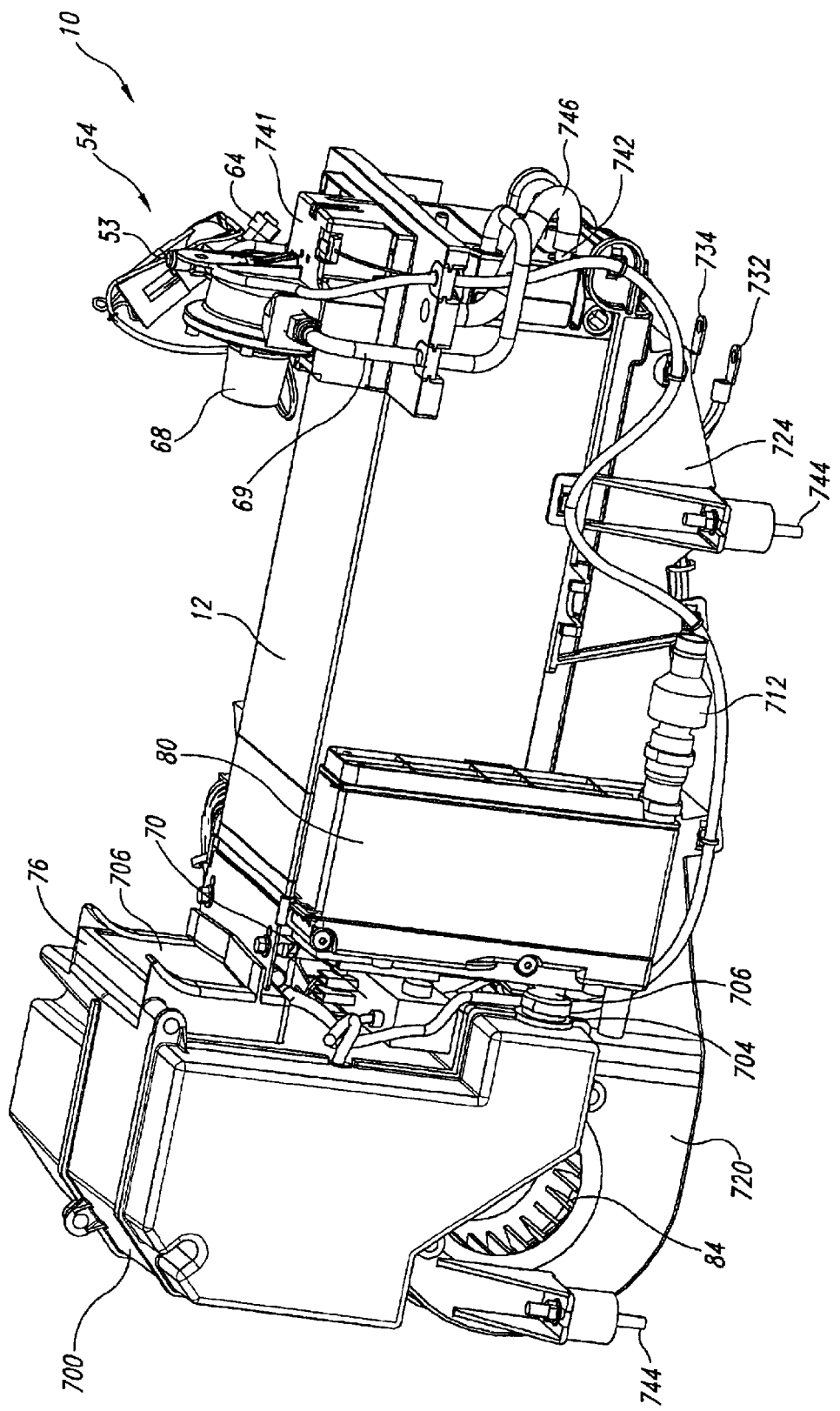
FIG. 5 is a top, right isometric view of a structural arrangement of various components of the fuel cell system of FIG. 1.
Figure 6:
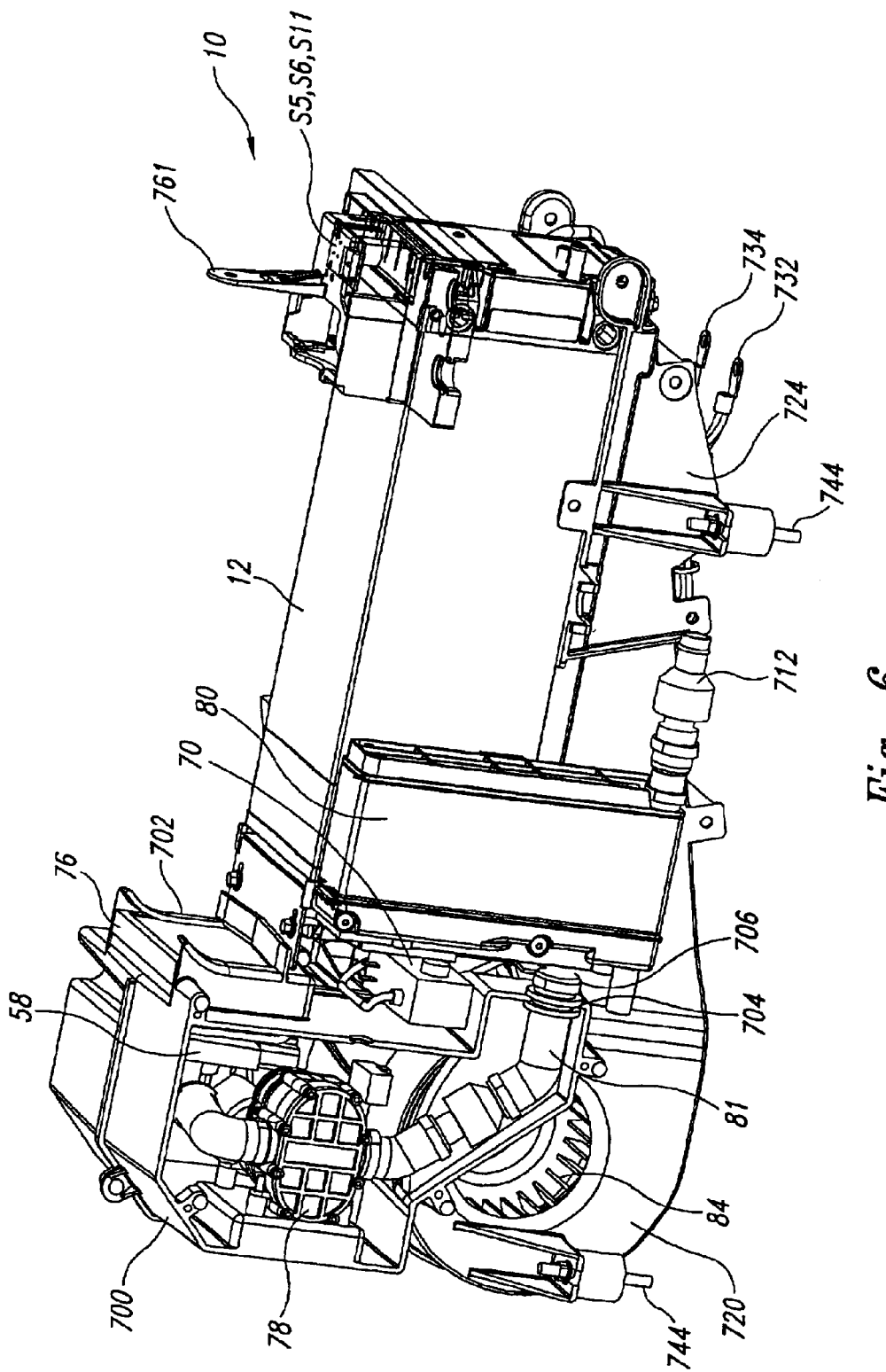
FIG. 6 is a top, right isometric view of the structural arrangement of various components of the fuel cell system of FIG. 5 with a cover removed.
Figure 7:
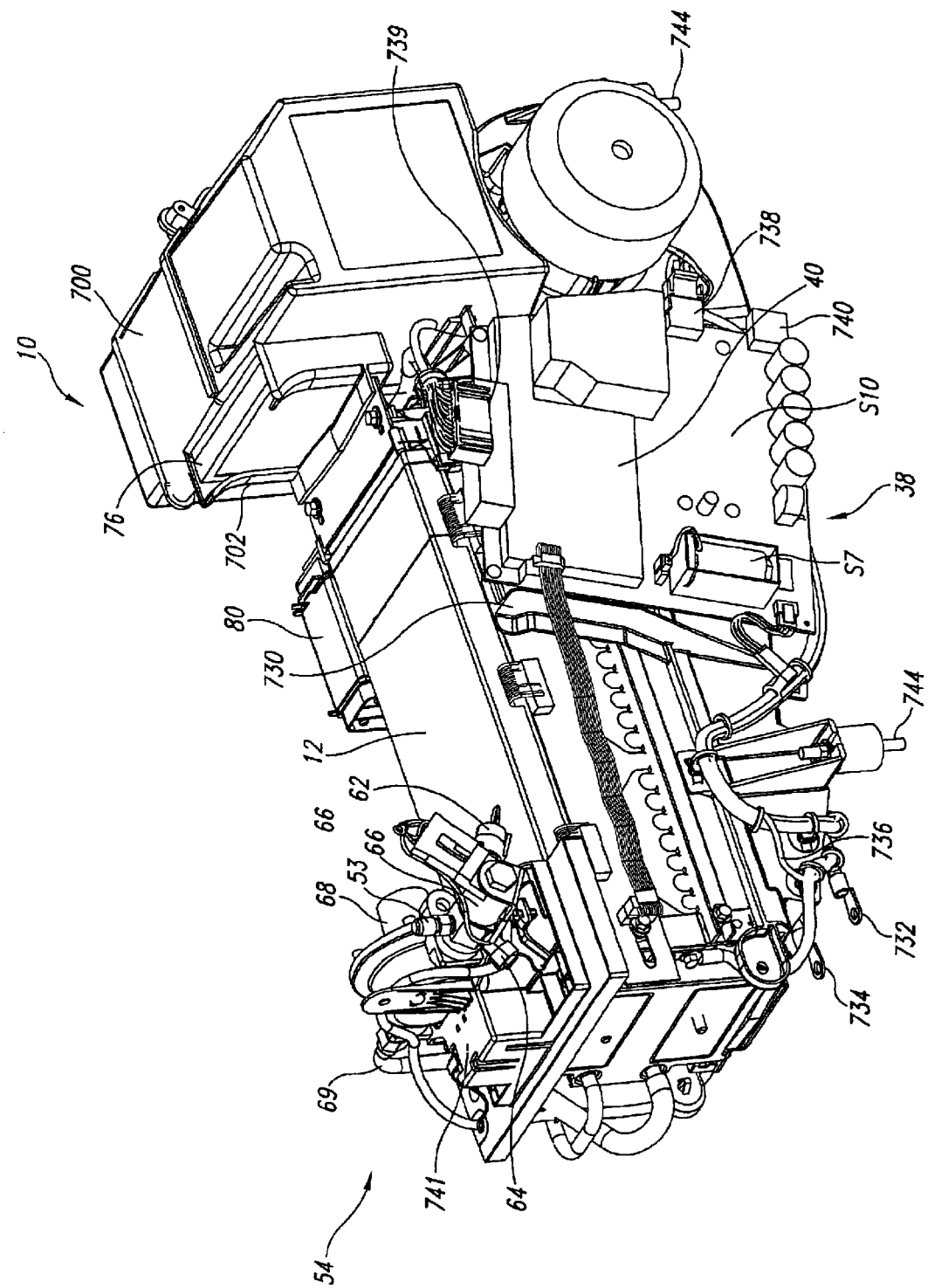
FIG. 7 is top, left isometric view of the structural arrangement of various components of the fuel cell system of FIG. 5.

Referring to FIGS. 5–7, the air compressor 78 and cooling fan 84 are grouped together at one end ("air supply end") of the fuel cell stack 12. Fuel tanks 52 (not shown in FIGS. 5–7) are mountable to the fuel cell system 10 on top of, and along the length of, the fuel cell stack 12. The components of fuel regulating system 54 upstream of the fuel cell stack 12 are located generally at the end of stack 12 ("hydrogen supply end") opposite the air supply end.

Air compressor 78 is housed within an insulated housing 700 that is removably attached to the fuel cell stack 12 at the air supply end. The housing 700 has an air supply aperture 702 covered by the filter 76 that allows supply air into housing 700. Air compressor 78 is a positive displacement low pressure type compressor and is operable to transmit supply air to air supply conduit 81 at a flow rate controllable by the operator. An air supply conduit 81 passes through a conduit aperture 704 in compressor housing 700 and connects with an air supply inlet 706 of humidity exchanger 80. Mass flow sensor S8 is located on an inlet of air compressor 78 and preferably within compressor housing 700.

Humidity exchanger 80 may be of the type disclosed in U.S. Pat. No. 6,106,964, and is mounted to one side of fuel cell stack 12 near the air supply end. Air entering into humidity exchanger 80 via air supply conduit 81 is humidified and then exhausted from the humidity exchanger 80 and into the fuel cell stack 12 (via the supply air inlet port of the end plate 18b). Exhaust air from the fuel cell stack 12 exits via the exhaust air outlet port in end plate 18b and is directed into humidity exchanger 80, where water in the air exhaust stream is transferred to the air supply stream. The air exhaust stream then leaves the humidity exchanger 80 via the air exhaust outlet 712 and is transmitted via an air exhaust conduit (not shown) to evaporator 58 (not shown in FIGS. 5–7) mountable to a cover (not shown) above fuel cell stack 12.

Cooling fan 84 is housed within a fan housing 720 that is removably mounted to the air supply end of fuel cell stack 12 and below compressor housing 700. Fan housing 720 includes a duct 724 that directs cooling air from cooling fan 84 to the cooling channel openings at the bottom of fuel cell stack 12. Cooling air is directed upwards and through fuel cell stack 12 (via the cooling channels 32) and is discharged from the cooling channel openings at the top of fuel cell stack 12. During operation, heat extracted from fuel cell stack 12 by the cooling air is used to warm fuel tanks 52 that are mountable directly above and along the length of stack 12. Some of the warmed cooling air can be redirected into the air supply aperture 702 of compressor housing 700 for use as oxidant supply air.

Referring particularly to FIG. 7, circuit board 38 carrying microcontroller 40, oxygen sensor S7 and ambient temperature sensor S10 is mounted on the side of fuel cell stack 12 opposite humidity exchanger 80 by way of a mounting bracket 730. Positive and negative electrical power supply lines 732, 734 extend from each end of fuel cell stack 12 and are connectable to an external load. An electrically conductive bleed wire 736 from each of power supply lines 732, 734 connects to circuit board 38 at a stack power-in terminal 738 and transmits some of the electricity generated by fuel cell stack 12 to power the components on the circuit board 38, as well as sensors 44 and actuators 46 which are electrically connected to circuit board 38 at terminal 739. Similarly, battery 47 (not shown in FIGS. 5–7) is electrically connected to circuit board 38 at battery power in terminal 740. Battery 47 supplies power to the circuit board components, sensors 44 and actuators 46 when fuel cell stack output has not yet reached nominal levels (e.g., at start-up); once fuel cell stack 12 has reached nominal operating conditions, fuel cell stack 12 can also supply power to recharge the battery 47.

Figure 8:
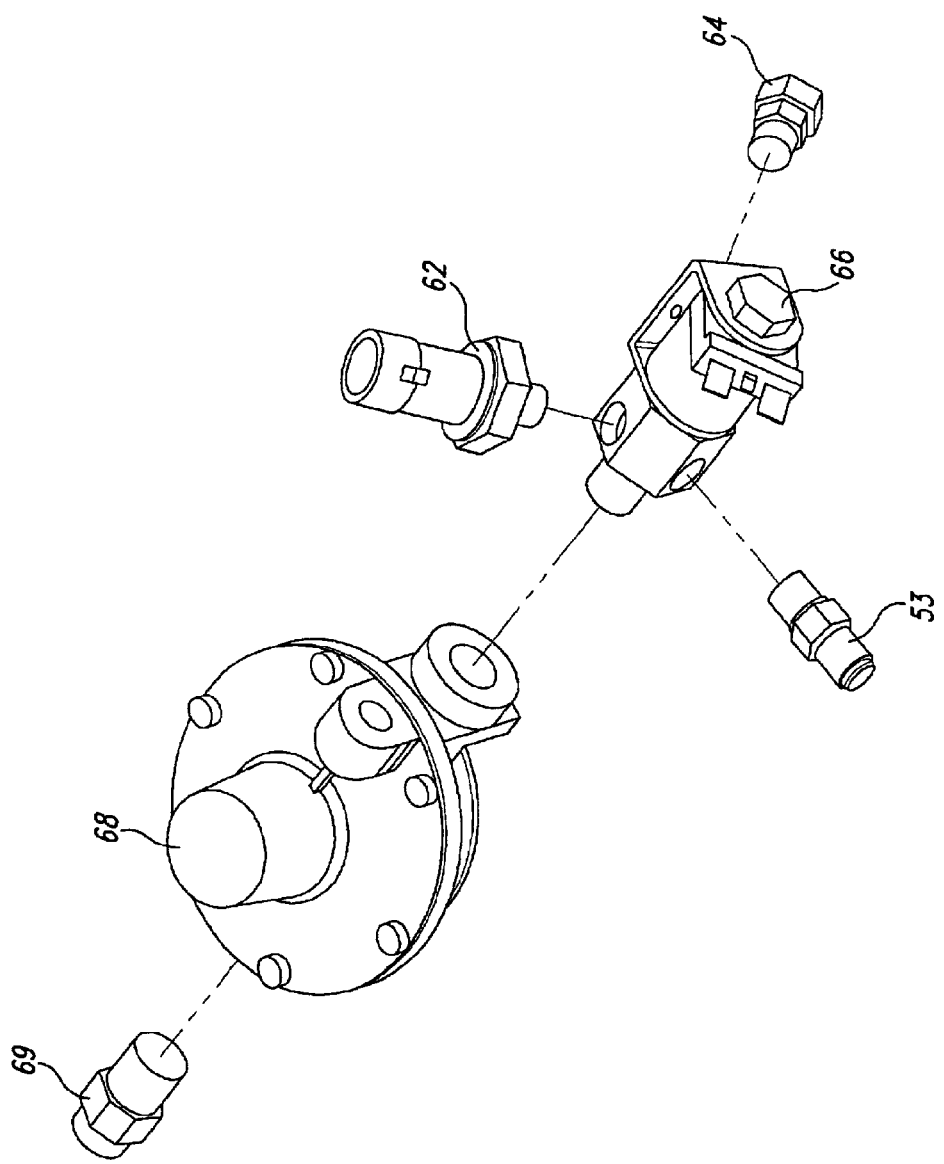
FIG. 8 is a top, right isometric view of a pressure regulator portion of the fuel cell system of FIG. 5.

Referring generally to FIGS. 5–7 and particularly to FIG. 8, a bracket 741 is provided at the hydrogen supply end for the mounting of a fuel tank valve connector 53, hydrogen pressure sensor 62, pressure relief valve 64, main gas valve 66, and hydrogen pressure regulator 68 above the fuel cell stack 12 at the hydrogen supply end. A suitable pressure regulator may be a Type 912 pressure regulator available from Fisher Controls of Marshalltown, Iowa. A suitable pressure sensor may be a transducer supplied Texas Instruments of Dallas, Tex. A suitable pressure relief valve may be supplied by Schraeder-Bridgeport of Buffalo Grove, Ill. The pressure relief valve 64 is provided for fuel tanks 52 and may be set to open at about 350 psi. A low pressure relief valve 742 is provided for the fuel cell stack 12. The bracket 741 also provides a mount for hydrogen concentration sensor S5, hydrogen heater current sensor S6 and hydrogen sensor check sensor S11, which are visible in FIG. 6 in which the bracket 741 is transparently illustrated in hidden line. The fuel tanks 52 are connectable to the fuel tank connector 53. When the fuel tank and main gas valves 56, 66 are opened, hydrogen is supplied under a controlled pressure (monitored by pressure sensor 62 and adjustable by hydrogen pressure regulator 68) through the fuel supply conduit 69 to the fuel inlet port of end plate 18a. The purge valve 70 is located at the fuel outlet port at end plate 18b.

Fuel cell system 10 and fuel tanks 52 are coupled to a base (not shown) at mounting points 744 and housed within a fuel cell system cover (not shown). Cooling air exhausted from the top of the fuel cell stack 12 is thus directed by the cover either to supply air inlet 702 or over fuel regulating system 54 to a cooling air discharge opening in the housing.

The fuel cell system 10 is designed so that components that are designed to discharge hydrogen or that present a risk of leaking hydrogen, are as much as practical, located in the cooling air path or have their discharge/leakage directed to the cooling air path. The cooling air path is defined by duct 724, cooling air channels of stack 12, and the portion of the system cover above stack 12; a cooling air stream passing through the cooling air path is shown by the arrows in FIGS. 5, 6 and 7. The components directly in the cooling air path include fuel tanks 52, and components of fuel regulating system 54 such as pressure relief valve 64, main gas valve 66, and hydrogen regulator 68. Components not directly in the cooling air path are fluidly connected to the cooling air path, and include purge valve 70 connected to duct 724 via purge conduit (not shown) and low pressure relief valve 742 connected to an outlet near fuel regulating system 54 via conduit 746. When cooling air fan 84 is operational, the cooling air stream carries leaked/discharged hydrogen through duct 724, past stack 12, and out of system 10 in the direction of the arrows shown in FIGS. 5, 6, and 7. Hydrogen concentration sensor S5 is strategically placed as far downstream as possible in the cooling air stream to detect hydrogen carried in the cooling air stream. Hydrogen concentration sensor S5 is also placed in the vicinity of the components of fuel regulating system 54 to improve detection of hydrogen leaks/discharges from fuel regulating system 54.

Exemplary Method of Operation

Fuel cell system 10 can employ a number of operating states that may determine which operations or tasks microcontroller 40 executes, and may determine the response of the microcontroller 40 to various readings or measurements of the fuel cell system operating parameters. Microcontroller 40 executes software that can be programmed into and executed from an on-chip flash memory of the microcontroller 40 or in other controller-readable memory. In particular, the fuel cell system 10 can employ a standby state, starting state, running state, warning state, failure state, and stopping state.

In a standby state the fuel cell stack 12 is not operating and the microcontroller 40 monitors a startline for a startup signal. For example, operator activation of a start button or switch (not shown) can generate the startup signal on the startup line.

In a starting state, microcontroller 40 initializes itself, places all actuators and control devices in their proper initial states, enables a serial interface, starts a watchdog timer, and performs a series of checks to ensure that all systems and components are operational. If the outcomes of the checks are satisfactory, microcontroller 40 causes the external load to be connected and enters a running state, otherwise the fuel cell system 10 enters a failure state without becoming operational.

In a running state, fuel and oxidant are supplied to the fully operational fuel cell stack 12. Microcontroller 40 monitors the performance of fuel cell system 10 based on the measured operating parameters, and controls the various systems via the various actuators discussed above. If microcontroller 40 determines that one or more operating parameters are outside of a warning range, microcontroller 40 places fuel cell system 10 into the warning state. If microcontroller 40 determines that one or more operating parameters are outside of a failure range, microcontroller 40 places the fuel cell system into the failure state. Otherwise, fuel cell system 10 continues in a running state until a stop signal is received on the startup line. In response to the stop signal, microcontroller 40 advances fuel cell system 10 from a running state to a stopping state if fuel cell system 10 has been in a running state for at least one minute. If so, the microcontroller 40 begins an extended shutdown procedure lasting approximately 45 seconds, during which time the fuel cell system 12 is in a stopping state. If not, microcontroller 40 engages the normal shutdown procedure and fuel cell system 10 proceeds directly from a running state to a standby state.

In a warning state, microcontroller 40 can provide a warning notification of the out-of-warning range condition to the operator, but otherwise the fuel cell system 10 continues to operate. Additionally, microcontroller 40 can write a warning condition code corresponding to the out-of-warning range condition to the persistent memory 42.

In a failure state, microcontroller 40 immediately stops operation of the fuel cell system 10 and writes a fault condition code to the persistent memory 42. The fuel cell system 10 remains in a failure state until a stop signal is received on the startline. In response to the stop signal, microcontroller 40 completes the shut down of the fuel cell system 10 and places the fuel cell system 10 into a standby state.

In a stopping state, microcontroller 40 shuts down the various components of the fuel cell system 10, stopping operation of the fuel cell system 10. Once the various components have been shut down, microcontroller 40 places the fuel cell system 10 into a standby state.

Figure 9A:
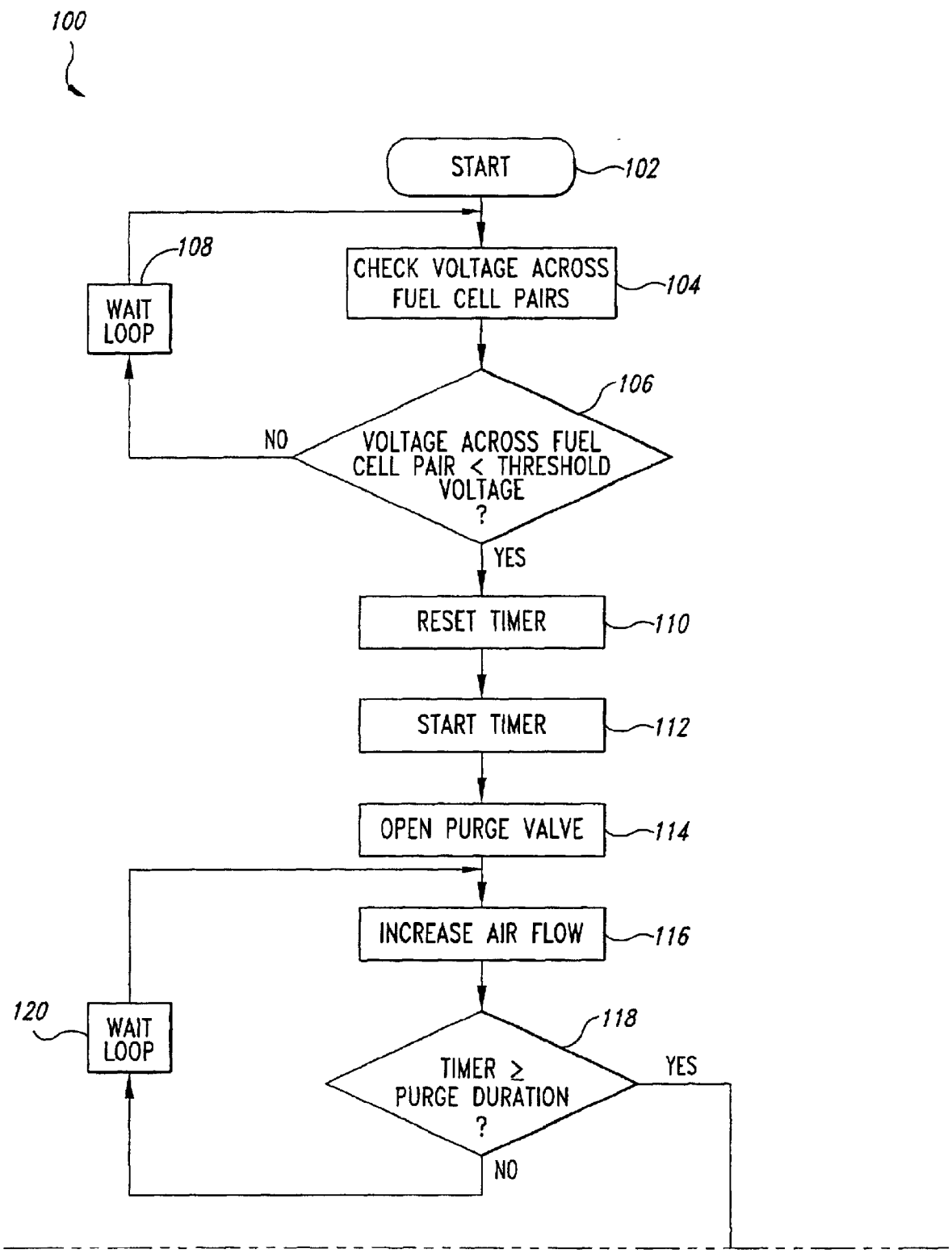
FIGS. 9A and 9B combined are a flow diagram showing a method of operation of the fuel cell system of FIGS. 1 and 2, including detecting a low voltage situation and resuscitating the fuel cell.
Figure 9B:
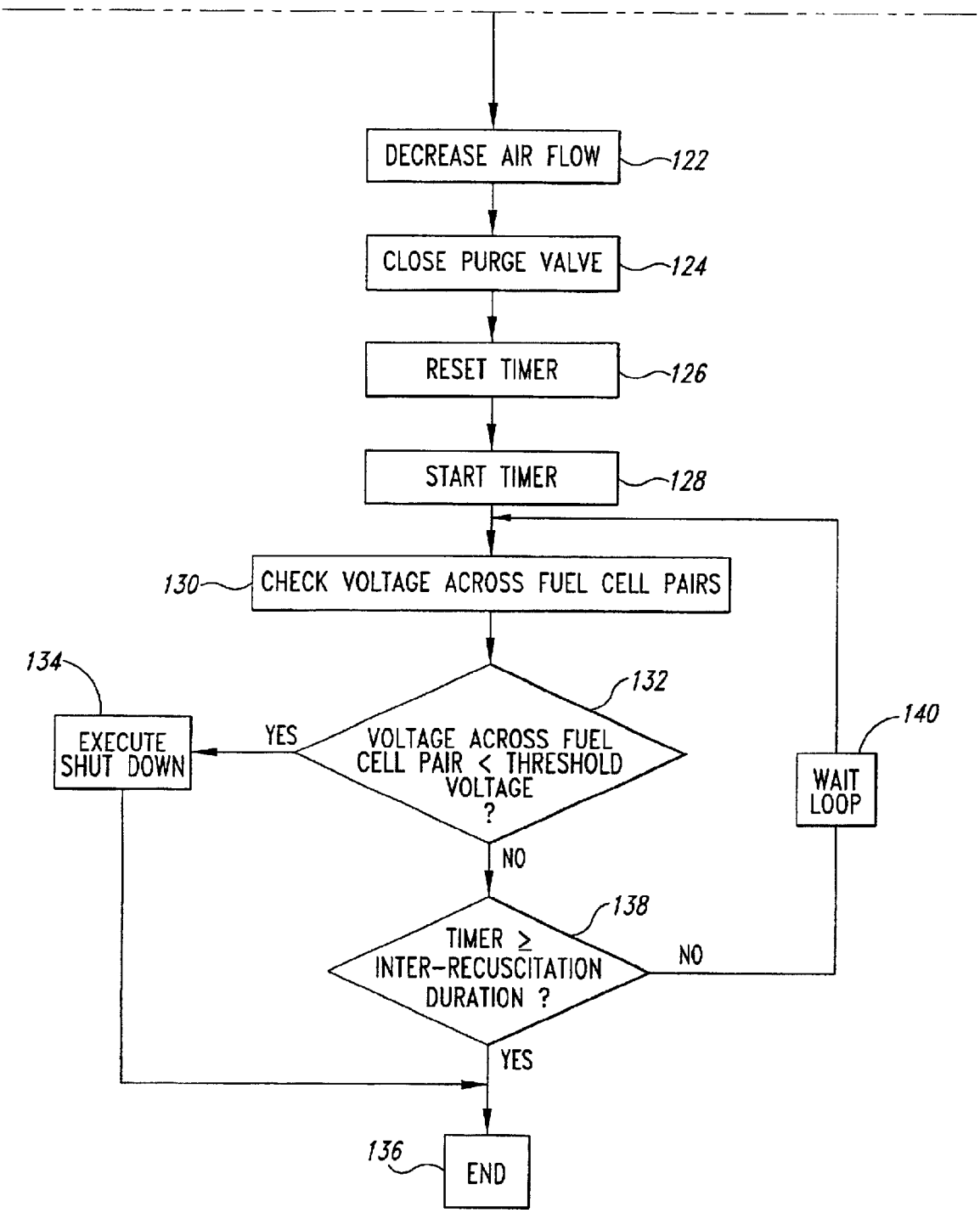

FIGS. 9A and 9B show an exemplary resuscitation method 100 for improving the performance of the one or more fuel cell assemblies 16 after the performance of one or more of the fuel cell assemblies 16 has fallen below a threshold value. Such a performance drop may be particularly a result of insufficient amounts of reactants reaching the electrocatalyst of each fuel cell assembly 16, e.g., when there has been water flooding of one or more of the reactant channels in the fuel cell. The method starts at step 102. In step 104, the microcontroller 40 checks the voltage across pairs of fuel cell assemblies 16. The microcontroller 40 can rely on a digital output of the cell voltage checker S9. For example, if the output of the cell voltage checker S9 is "0" or LOW, the microcontroller 40 determines that the voltage across at least one pair of the fuel cell assemblies 16 is below a threshold voltage.

While any circuit that determines the voltage across one or more fuel cell assemblies 16 is suitable, the cell voltage checker S9 disclosed in commonly assigned U.S. patent application Ser. No. 09/916,115, titled "FUEL CELL ANOMALY DETECTION METHOD AND APPARATUS" and having a common filing date herewith is particularly suited to the described fuel cell system 10. A suitable threshold voltage may be between approximately 0.8 V and 0.85 V for a pair of the fuel cell assemblies 16, where each fuel cell assembly 16 in the pair nominally produces approximately 0.6 V across the anode 22 and cathode 24.

In step 106, the microcontroller 40 passes control to step 108, performing a first wait-loop if the voltage across a pair of the fuel cell assemblies 16 is not less than the threshold voltage. The microcontroller 40 passes control to step 110 if the voltage across a pair of the fuel cell assemblies 16 is less than the threshold voltage.

In step 110, the microcontroller 40 resets a timer. The fuel cell monitoring and control system 14 can employ one or more timers, which may be integral to the microcontroller 40 or may be discrete components. In step 112, microcontroller 40 starts the timer. In step 114, the microcontroller 40 sends an appropriate signal to the purge valve controller CS4 to open the purge valve 70, which is connected to reactant channel 30 carrying the fuel in purge cell portion 36. In step 116, the microcontroller 40 provides signals to the air compressor controller CS1 to increase the duty cycle of air compressor 78, to increase airflow. A suitable increase in duty cycle may be 50% over a standard operating duty cycle. A suitable purge and resuscitation duration may be between approximately 5 and 10 seconds.

In certain situations where microcontroller 40 determines the cause of the loss in performance is due to a build up of impurities in purge cell portion 36, microcontroller 40 only causes fuel purge valve 70 to be opened, without increasing the air flow rate through fuel cell stack 12. In another embodiment, the microcontroller 40 only increases the air flow rate through fuel cell stack 12 without opening purge valve 70, where microcontroller 40 determines the cause of the loss in performance could be due to an insufficient supply of air to the electrocatalyst in fuel cell assembly 16.

In step 118, the microcontroller 40 determines if the timer reading is equal to or greater than the purge duration. The microcontroller 40 passes control to step 120, performing a second wait-loop, if the timer reading is not greater than or equal to the purge duration. The microcontroller 40 passes control to step 122 if the timer reading is greater than or equal to the purge duration.

In step 122, the microcontroller 40 sends an appropriate signal to the air compressor controller CS1 to lower the duty cycle of the air compressor 78, to decrease airflow. In step 124, the microcontroller 40 sends an appropriate signal to the purge valve controller CS4 to close purge valve 70, ending the resuscitation procedure.

In step 126, the microcontroller 40 resets the timer in preparation for an inter-resuscitation procedure. The inter-resuscitation period is a defined time period, immediately following the application of a resuscitation step, during which successive attempts at performance recovery by resuscitation are prevented. A suitable inter-resuscitation period may be approximately 20 seconds. In step 128, the microcontroller 40 starts the timer.

In step 130, the microcontroller 40 checks the voltage across the fuel cell pairs, in a similar fashion to that of step 104. In step 132, the microcontroller 40 passes control to step 134 to enter a failure state, stopping operation of the fuel cell stack 12 if the voltage across a pair of fuel cells is less than a threshold voltage (which can be the same or different than the threshold voltage used in step 106) during an inter-resuscitation period, and terminating the resuscitation method 100 in step 136. This condition constitutes a restartable error, so the microcontroller 40 does not set a non-restartable status flag. If the voltage across a pair of fuel cell assemblies 16 is not less than the threshold voltage in step 132, the microcontroller 40 passes control to step 138.

In step 138, microcontroller 40 determines if the timer reading is equal to or greater than the inter-resuscitation period. Microcontroller 40 passes control to step 136 if the timer reading is equal to or greater than the inter-resuscitation period. Microcontroller 40 passes control to step 140, performing a third wait-loop if the timer reading is not greater than or equal to the inter-resuscitation period. After the inter-resuscitation period is complete, the microcontroller returns to its previous state, and can perform further resuscitation steps, as required.

The resuscitation method described above can be performed in a fuel cell system operable at various power outputs or load settings. Fuel cell system 10 can be operated at "low load," for example below 15 A for the illustrated system 10, when a small number of low power electrical devices are connected to and draw power from fuel cell system, or when the fuel cell system is idling. When operating at low load, the oxidant air flow rate required to maintain a desired stoichiometry (typically about 2.0) may be insufficient to remove water buildup at the cathode, and cathode flooding of one or more fuel cell assemblies in the system 10 may eventually occur. To prevent or at least reduce problems associated with cathode flooding during low load operation, a resuscitation method can be applied at intermittent intervals as part of a water management strategy for low load operation. In this connection, when the fuel cell system is operating under low load conditions (for example, below a threshold power output) the oxidant air flow rate can be intermittently and temporarily increased (typically increasing the stoichiometry above the nominal value) to remove excess water in the cathode, and optionally the fuel purge valve (if present) can be intermittently and temporarily opened. The resuscitation method can thus be performed at defined time intervals when power output is below a threshold level, and whenever the cell voltage checker S9 detect that a fuel cell pair has fallen below a voltage threshold. This threshold can correspond to a voltage of a fuel cell pair that suffers from cathode flooding.

Tests were performed on fuel cell stack 12 to determine an appropriate interval between timed resuscitation steps, and the appropriate duration of the resuscitation step. To determine an appropriate frequency, the microcontroller 40 was programmed to trigger resuscitation steps whenever the cell voltage of a monitored cell pair fell below 75% of the average voltage of cell pairs in the stack. The minimum, maximum and mean time between resuscitation steps were measured. The tests were conducted for loads between 1 and 15 A. Nominal air flow rate was set to provide a stoichiometry of 2.0, with a minimum nominal air flow rate of 16 slpm to reflect the minimum air flow rate that can be produced by the air compressor of particular fuel cell system 10.

The test data indicated that significant cathode flooding did not occur for loads greater than 15 A, or below 5 A. At less than 5 A, fuel cell stack 12 experienced dehydration, possibly due to excessive oxidant flows resulting from the compressor's inability to provide an air flow rate below 16 slpm. For loads between 5 and 15 A, an increase in the oxidant air flow rate for 10 seconds to a flow rate equivalent to a stoichiometry of 2.0 at 30 A (46 slpm), with a 10 minute interval between these resuscitation steps, was found to improve fuel cell performance at low loads (between 5 A and 15 A).

Alternatively, or in addition, the resuscitation steps can be performed whenever a low voltage condition is detected by the cell voltage checker S9.

Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other fuel cell systems, not necessarily the PEM fuel cell system described above.

Commonly assigned U.S. patent applications Ser. No. 09/916,241, entitled FUEL CELL AMBIENT ENVIRONMENT MONITORING AND CONTROL APPARATUS AND METHOD; Ser. No. 09/917,117, entitled FUEL CELL CONTROLLER SELF INSPECTION; Ser. No. 09/916,115, entitled FUEL CELL ANOMALY DETECTION METHOD AND APPARATUS; Ser. No. 09/916,211, entitled FUEL CELL PURGING METHOD AND APPARATUS; Ser. No. 09/916,240, entitled FUEL CELL SYSTEM METHOD, APPARATUS AND SCHEDULING; Ser. No. 09/916,239, entitled FUEL CELL SYSTEM AUTOMATIC POWER SWITCHING METHOD AND APPARATUS; Ser. No. 09/916,118, entitled PRODUCT WATER PUMP FOR FUEL CELL SYSTEM; and Ser. No. 09/916,212, entitled FUEL CELL SYSTEM HAVING A HYDROGEN SENSOR, all filed Jul. 25, 2001, are incorporated herein by reference, in their entirety.

The various embodiments described above and in the applications and patents incorporated herein by reference can be combined to provide further embodiments. The described methods can omit some acts and can add other acts, and can execute the acts in a different order than that illustrated, to achieve the advantages of the invention.

These and other changes can be made to the invention in light of the above detailed description. In general, in the following claims, the terms used should not be construed to limit the invention to the specific embodiments disclosed in the specification, but should be construed to include all fuel cell systems, controllers and processors, actuators, and sensors that operate in accordance with the claims. Accordingly, the invention is not limited by the disclosure, but instead its scope is to be determined entirely by the following claims.

What is claimed is:

1. A fuel cell system, comprising:
   a fuel cell stack comprising a plurality of fuel cells, a fuel passage for directing a fuel stream through the plurality of fuel cells, and an oxidant passage for directing an oxidant stream through the plurality of fuel cells; and
   a controller configured to temporarily increase the oxidant stream flow rate through the oxidant passage for a resuscitation duration, if the performance of at least one fuel cell in the fuel cell stack falls below a defined threshold value.

2. The fuel cell system of claim 1, further comprising a purge valve coupled to the fuel passage, wherein the controller is coupled to the purge valve and configured to open the purge valve for a purge duration if the performance of at least one fuel cell in the fuel cell stack falls below the defined threshold value.

3. The fuel cell system of claim 2, further comprising a sensor for monitoring a voltage across at least one pair of fuel cells in the fuel cell stack, and wherein the controller is configured to open the purge valve for the purge duration and to increase the oxidant stream flow rate through the oxidant passage of the fuel cell stack for the resuscitation duration, if the cell voltage across a monitored pair of fuel cells is less than a threshold voltage.

4. The fuel cell system of claim 3, further comprising:
an air compressor in fluid communication with the oxidant passage for delivery of oxidant air therethrough and coupled to the controller for control thereby.

5. The fuel cell system of claim 4 wherein the controller is configured to increase the air flow rate while the purge valve is open.

6. The fuel cell system of claim 1, further comprising:
an air compressor in fluid communication with the oxidant passage for delivery of oxidant air therethrough and coupled to the controller for control thereby, wherein the controller is configured to temporarily increase the oxidant stream flow rate by increasing a duty cycle of the air compressor by approximately 50 percent.

7. The fuel cell system of claim 1, further comprising:
an air compressor in fluid communication with the oxidant passage for delivery of oxidant therethrough and coupled to the controller for control thereby, wherein the controller is configured to temporarily increase the oxidant air flow by increasing a duty cycle of the air compressor by approximately 50 percent for a resuscitation duration of approximately 5 seconds.

8. The fuel cell system of claim 1 wherein the controller is further configured to restore the oxidant stream flow rate for an inter-resuscitation period, immediately following the resuscitation duration, and to shut down fuel cell operation if the performance of at least one fuel cell in the fuel cell stack is below a defined threshold value during the inter-resuscitation period.

9. The fuel cell system of claim 2 wherein the purge duration and the resuscitation duration are the same, and the controller is further configured to close the purge valve for an inter-resuscitation period immediately following the purge duration, and to shut down fuel cell operation if the performance of at least one fuel cell in the fuel cell stack is below a defined threshold value during the inter-resuscitation period.

10. A resuscitation system for use with a fuel cell assembly, comprising:
a purge valve couplable to a fuel passage of a fuel cell stack;
an oxidant flow device couplable to an oxidant passage of the fuel cell stack to provide an oxidant stream flow through the fuel cell stack; and
a controller coupled to the purge valve and the oxidant flow device and configured to open the purge valve for a purge duration and to increase the oxidant stream flow rate from the oxidant flow device source through the stack for a resuscitation duration, if the performance of at least one fuel cell in the fuel cell stack is below a defined threshold value.

11. The resuscitation system of claim 10, further comprising a sensor for monitoring a voltage across at least one pair of fuel cells in the fuel cell stack, and wherein the controller is configured to open the purge valve for a purge duration and to increase oxidant stream flow rate through the stack for a resuscitation duration, if the cell voltage across a monitored pair of fuel cells is less than a defined threshold voltage.

12. The resuscitation system of claim 11 wherein the oxidant flow device comprises an air compressor coupled to the controller for control thereby.

13. The resuscitation system of claim 11 wherein the controller is configured to increase the oxidant flow rate while the purge valve is open.

14. The resuscitation system of claim 11 wherein the oxidant flow device comprises an air compressor and the controller is configured to increase the air flow rate by increasing a duty cycle of the air compressor by approximately 50 percent.

15. The resuscitation system of claim 11 wherein the oxidant flow device comprises an air compressor and the controller increases the air flow rate by increasing a duty cycle of the air compressor by approximately 50 percent for a resuscitation duration of approximately 5 seconds.

16. The resuscitation system of claim 11 wherein the controller is further configured to close the purge valve for an inter-resuscitation period, immediately following the purge duration.

17. The resuscitation system of claim 11 wherein the controller is further configured to close the purge valve for an inter-resuscitation period immediately following the purge duration, and to shut down fuel cell operation if the performance of at least one fuel cell in the fuel cell stack is below a defined threshold value during the inter-resuscitation period.

18. A method of operating a fuel cell system, comprising:
determining the voltage across at least one fuel cell in a fuel cell stack;
opening a purge valve connected to a fuel passage of the fuel cell stack for a purge duration if the voltage across at least one fuel cell is less than a defined threshold voltage, and
increasing an oxidant stream flow rate through an oxidant passage of the fuel cell stack for the purge duration, if the voltage across at least one fuel cell is less than the defined threshold voltage.

19. The method of claim 18 wherein the voltage is determined across at least one pair of fuel cells in the fuel cell stack, and the purge valve is opened and the oxidant stream flow rate is increased if the voltage across a pair of fuel cells is less than a defined threshold voltage.

20. The method of claim 19, further comprising:
ceasing fuel cell operation if a voltage across at least one pair of fuel cells is less than a defined threshold voltage during an inter-resuscitation period immediately following the purge duration.

21. A method of operating a fuel cell system, comprising:
(a) monitoring a parameter indicative of the performance of at least one fuel cell in a fuel cell stack; and
(b) temporarily increasing an oxidant stream flow rate through an oxidant passage of the fuel cell stack if the performance of the at least one fuel cell is below a defined threshold performance value.

22. The method of claim 21 wherein the oxidant stream flow rate is temporarily increased if the value of the monitored parameter is outside of a defined range.

23. The method of claim 21 wherein step (b) comprises temporarily increasing the oxidant stoichiometry.

24. The method of claim 21, further comprising:
(c) increasing a fuel stream flow rate through a fuel passage of the fuel cell stack, if the performance of the at least one fuel cell is below the defined threshold performance value.

25. The method of claim 24 wherein in step (a) the voltage across a pair of fuel cells in the fuel cell stack is monitored, and in steps (b) and (c), the fuel and oxidant stream flow rates are increased when the voltage across at least one pair of fuel cells in the fuel cell stack is less than a defined threshold voltage.

26. The method of claim 21 wherein increasing the oxidant stream flow rate through an oxidant passage of the fuel cell stack includes increasing a duty cycle of an air compressor coupled to the oxidant passage by approximately 50 percent.

27. The method of claim 21 wherein increasing the oxidant stream flow rate through an oxidant passage of the fuel cell stack includes increasing a duty cycle of an air compressor coupled to the oxidant passage by approximately 50 percent for a resuscitation duration of approximately 5 seconds.

28. The method of claim 21, further comprising:
(c) opening a purge valve connected to a fuel passage of the fuel cell stack for a purge duration, if the voltage across at least one fuel cell in the fuel cell stack is less than a defined threshold voltage.

29. The method of claim 28 wherein increasing the oxidant stream flow rate through an oxidant passage of the fuel cell stack includes increasing a duty cycle of an air compressor coupled to the oxidant passage while the purge valve is open.

30. The method of claim 21 wherein in step (b) the oxidant stream flow rate is increased for a resuscitation duration and the method further comprises
shutting down fuel cell operation if the performance of the at least one fuel cell is below a defined threshold performance value during a defined inter-resuscitation period following the resuscitation duration.

31. The method of claim 21, further comprising:
(c) opening a purge valve connected to a fuel passage of the fuel cell stack for a purge duration, if the performance of the at least one fuel cell is below a defined threshold performance value;
(d) closing the purge valve for an inter-resuscitation period, immediately following the purge duration; and
(e) shutting down fuel cell operation if a voltage of at least one fuel cell is less than the defined threshold voltage during the inter-resuscitation period.

32. The method of claim 31 wherein in (c) the purge valve is opened if the voltage across at least one pair of fuel cells in the fuel cell stack is less than a defined threshold voltage for a pair of fuel cells.

33. A computer-readable media containing instructions to cause a processor to control operation of a fuel cell system, by:
determining if a voltage across at least one pair of fuel cells in a fuel cell stack is less than a defined threshold voltage;
opening a purge valve connected to a fuel passage of the fuel cell stack for a purge duration, if the voltage across at least one pair of fuel cells in the fuel cell stack is less than a defined threshold voltage for a pair of fuel cells; and
increasing an oxidant air flow rate through an oxidant passage of the fuel cell stack for a resuscitation duration, if the voltage across at least one of the pair of fuel cells in the fuel cell stack is less than the defined threshold voltage.

34. The computer-readable media of claim 33 wherein the computer-readable media comprises a memory structure of a microcontroller.

35. The computer-readable media of claim 33 containing instructions to cause a processor to control operation of a fuel cell system, further by:
closing the purge valve for an inter-resuscitation period, immediately following the purge duration.

36. The computer-readable media of claim 33 containing instructions to cause a processor to control operation of a fuel cell system, further by:
closing the purge valve for an inter-resuscitation period, immediately following the purge duration; and
shutting down fuel cell operation if a voltage across a pair of fuel cells is less than the defined threshold voltage during the inter-resuscitation period.

37. A method of operating a fuel cell system comprising:
supplying fuel to a fuel cell stack via a fuel passage of the fuel cell stack;
directing an oxidant stream through an oxidant passage of the fuel cell stack at a nominal air flow rate corresponding to the power output of the fuel cell stack; and,
intermittently temporarily increasing the oxidant air flow rate beyond the nominal air flow rate.

38. The method of claim 37 wherein intermittently temporarily increasing the oxidant air flow rate beyond the nominal air flow rate when the power output of the stack is below a defined threshold includes intermittently temporarily increasing the oxidant stoichiometry.

39. The method of claim 37, further comprising:
intermittently opening a purge valve connected to the fuel passage to purge at least some water from the fuel cell stack.

40. The method of claim 37 wherein the oxidant air flow rate is increased at periodic regular intervals.

41. The method of claim 37 wherein the oxidant air flow rate is increased when the power output of the stack is below a defined threshold.

* * * * *